July 19, 1927.
H. C. PRIEBE
FRICTION DRAFT GEAR
Filed March 9, 1926
1,636,435
2 Sheets-Sheet 2
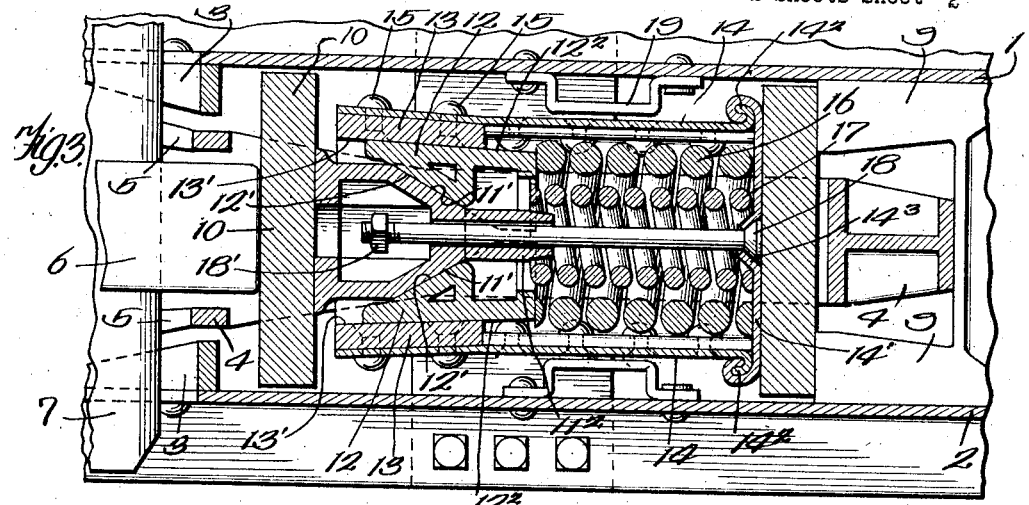
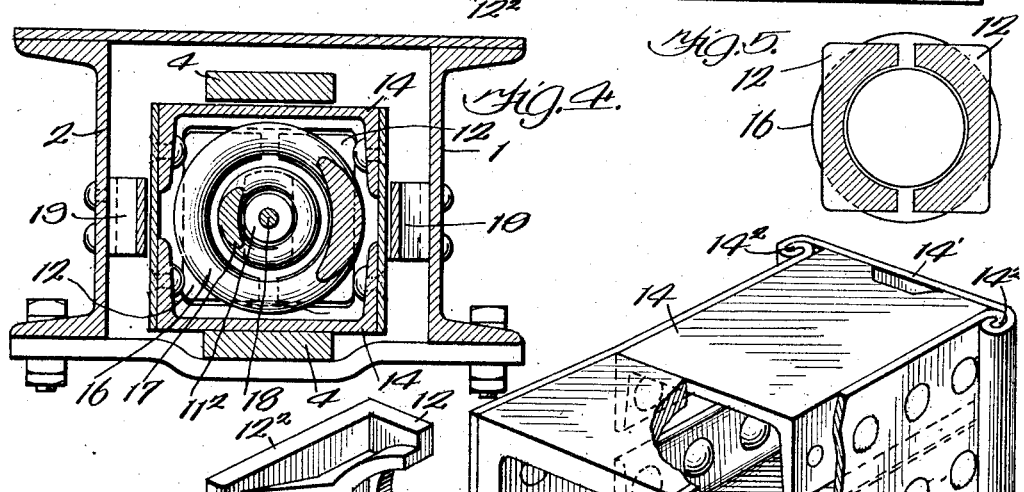
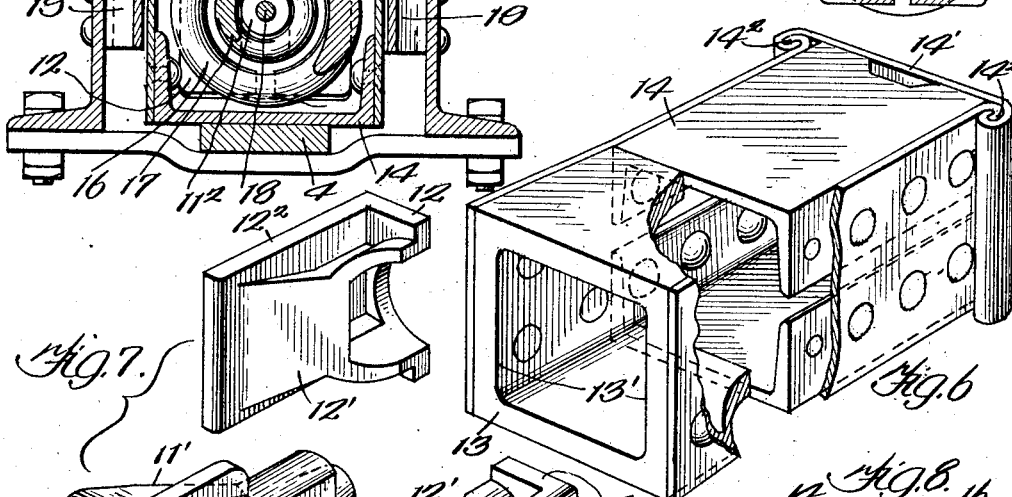
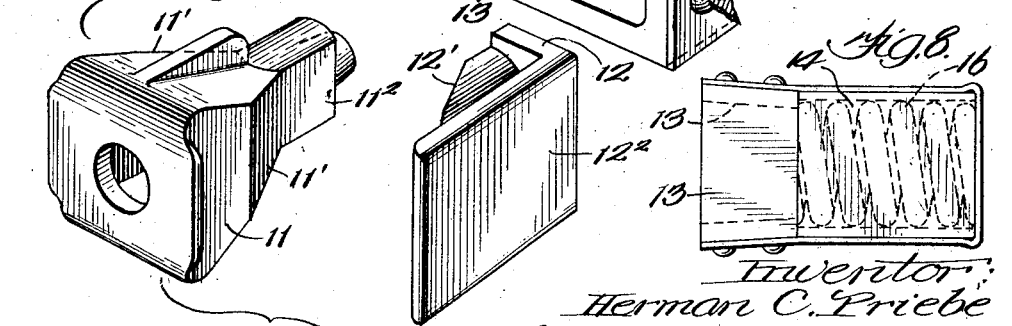

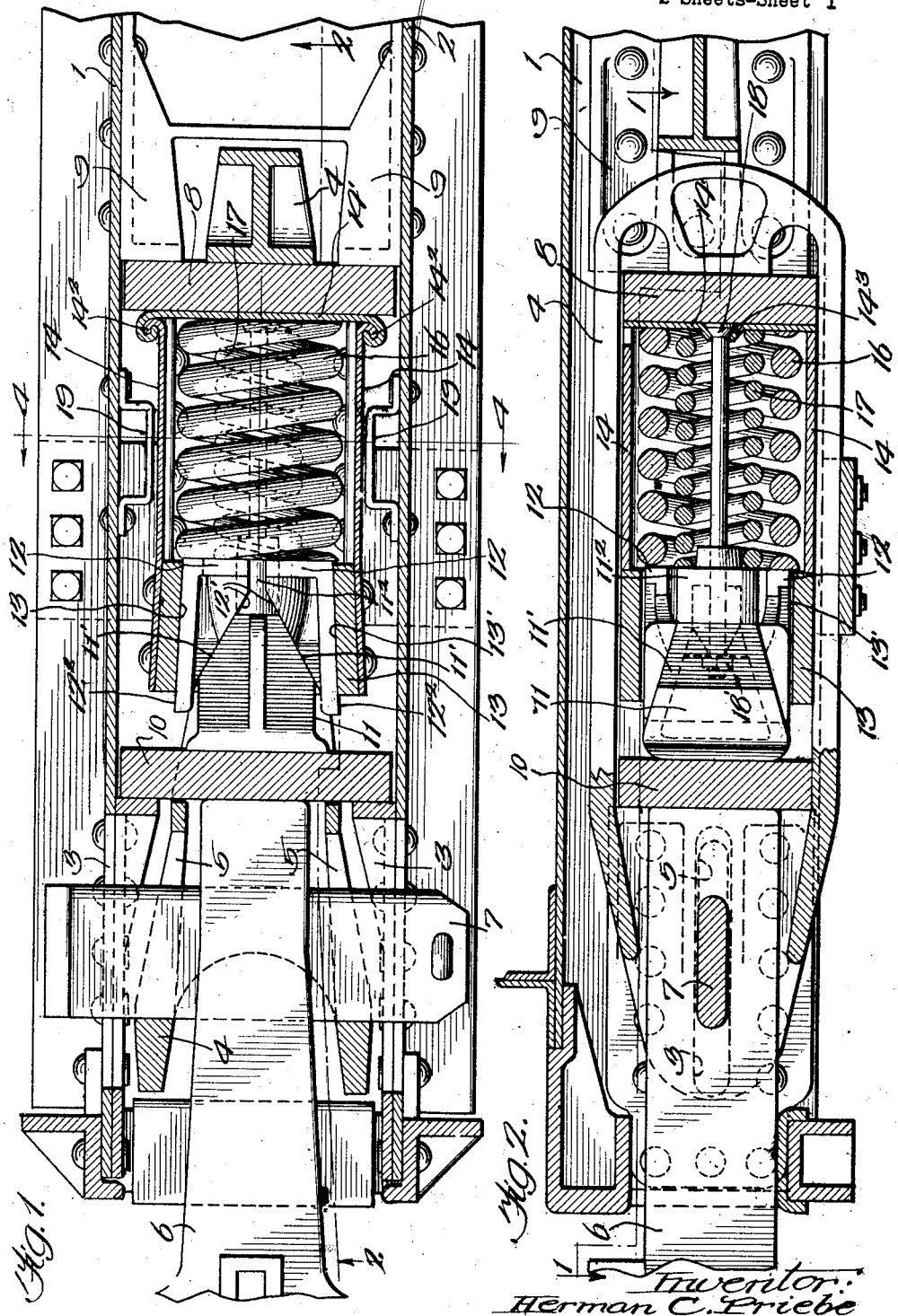

Patented July 19, 1927.

1,636,435

UNITED STATES PATENT OFFICE.

HERMAN C. PRIEBE, OF BLUE ISLAND, ILLINOIS.

FRICTION DRAFT GEAR.

Application filed March 9, 1926. Serial No. 93,413.

My invention relates to friction draft gears employing spring and friction block enclosing friction shells and has for its object an improved construction and relation of the shells. In order that the friction shell may be manufactured with its friction faces in position, a difficulty is encountered in assembling the springs within the shell. I overcome this difficulty by providing the shell with a separately formed wall portion affording an opening in the shell, prior to the assembly of such wall portion, through which the springs may be inserted into the shell.

I will explain my invention more fully by reference to the accompanying drawings in which Fig. 1 is a sectional plan view of a friction draft gear constructed in accordance with the preferred embodiment of the invention and taken generally on line 1—1 of Fig. 2; Fig. 2 is a sectional elevation on line 2—2 of Fig. 1; Fig. 3 is a sectional plan view of a portion of the gear illustrating parts as they would be related under a buffing strain; Fig. 4 is a sectional view on line 4—4 of Fig. 1; Fig. 5 is a view, somewhat diagrammatic, illustrating the interrelation of the application spring with blocks pressed upon thereby; Fig. 6 is a perspective view of the friction shell, with parts broken away; Fig. 7 is a perspective view showing three of the inter-related friction blocks; and Fig. 8 is a plan view, on a smaller scale, of the friction shell parts appearing by dotted lines.

The center sills 1 and 2 of a car desirably also constitute the draft sills of the gear. These center sills are formed each with a longitudinal slot 3. The coupler yoke 4 is desirably disposed with its sides in the same vertical plane. Each side of this coupler yoke is formed with a longitudinal slot 5 communicating with the slot 3 of the adjacent sill. The coupler stem 6 carries a key 7 that extends transversely of the sills and which passes through the slots 3 and 5. Where the coupler stem and the coupler yoke are in lost motion relation, the slots 5 are longer than the width of the key so that the key may move lengthwise of the coupler yoke to a limited extent and may engage one end of each of the slots 5 to move with the coupler yoke. The invention, however, is not to be limited to the lost motion relation of the coupler stem and yoke. The key, by being passed through the center sills as illustrated, takes part in supporting the coupler stem and yoke upon and in sliding relation to the sills, the slots 3 being sufficiently long to permit the coupler stem to move longitudinally of the sills throughout its operating range. The inward motion of the inner follower 8 is limited by the draft lugs or stops 9 which are carried by the center sills and engage said follower for this purpose. The outer follower 10 is engaged by the inner end of the coupler stem. A single friction block 11 is coaxial with the gear, being in line with the coupler stem. The follower 10 is interposed between this friction block and the coupler stem whereby said block is moved inwardly in response to buffing or pushing strains. The block 11 is of wedge form, having two wedging faces 11' which converge inwardly toward the axis of the gear. The tapering wedge portion of the block is received between two friction shoes 12 which have inner wedging faces 12' that are preferably in frictional engagement with the outer wedging faces 11' of block 11. The shoes 12 have outer friction faces 12² which are in frictional engagement with the inner friction faces 13' of the friction blocks or inwardly projecting shoulders 13 that are rivited upon the inner side of the friction shell or spring barrel 14 by rivets 15, the blocks 13 constituting parts of the friction shell. The shell 14 is closed at its inner end by a separately formed rear wall 14' which is interfitted with the side walls of the shell 14, as indicated at 14², opposite sides of the wall 14' and the sides of the shell adjacent thereto having intermeshing curled formations. The inner friction faces 13' of the blocks or shoulders 13 desirably converge inwardly toward the axis of the gear, the side walls of the shell being flared for this purpose if said blocks or shoulders 13 are of uniform thickness.

A coiled spring 16 is housed within the shell 14, this spring having an external radius which extends laterally of the gear beyond the shoes 12, said spring thus lapping the blocks or shoulders 13. The spring is inserted within the shell before the rear end wall of the shell is assembled with the side walls of the shell, the space between the blocks or shoulders 13 preventing the insertion of the spring from the front end of the shell. The inner end wall 14' of the shell is engaged by the inner follower 8 that is interposed between the shell and the inner end of the yoke. The shell is thus subject to pulling strains. By thus extending the spring laterally of the gear beyond the shoes 12, an extended area of engagement is afforded between the outer end of the spring and the inner ends of these shoes, as indicated by the shaded portion of Fig. 5. The spring thus presses upon the inner ends of the shoes 12 on the adjacent transverse edge of the outer friction faces 12² of these shoes, as indicated diagrammatically in Fig. 5. The application springs of prior friction draft gears did not reach these transverse edges on which account the springs would tend to tilt the shoes 12 and reduce the full frictional engagement of the friction surfaces 12² and 13', a result which is avoided by the arrangement described. In addition to the advantages stated, the capacity of the application spring is increased.

A releasing spring 17 is surrounded by the spring 16 and presses upon the inner end of the extension 11² of the block 11. A tie rod 18 is formed with a head upon its inner end that is received in a socket 14³ formed in the wall 14'. This tie rod passes through a bore that is formed in the inner end of the block 11 and its extension 11². The outer end of the tie rod projects into the hollow interior of the block 11 and carries an adjusting nut 18'. This tie rod serves to hold the parts of the gear that are interposed between the sills 1 and 2 in assembly prior to the insertion of the gear within the yoke and between the followers. The friction shell 14 is held substantially coaxial with the gear by means of the U-shaped guides 19 that are riveted to the sides of the center sills.

While the friction blocks are shown as being at the outer end of the gear, the invention is, obviously, not to be thus limited.

Changes may be made without departing from the invention.

Having thus described my invention, I claim:

1. In a friction draft gear, a friction shell having inwardly projecting friction shoulders; a spring enclosed within the shell; and friction mechanism including friction shoes pressed upon by the spring and engaging the aforesaid shoulders, said shell having a separately formed wall portion covering a space through which said spring may be admitted to the shell, this wall portion and adjacent portions of the shell having intermeshing curled formations whereby said wall portion may be assembled with the balance of the shell.

2. In a friction draft gear, a friction shell having inwardly projecting friction shoulders; a spring enclosed within the shell; and friction mechanism including friction shoes pressed upon by the spring and engaging the aforesaid shoulders, said shell having a separately formed end wall which closes the shell at one end where said spring may be admitted to the shell, this end wall and adjacent wall portions of the shell having intermeshing curled formations whereby said end wall may be assembled with the balance of the shell.

In witness whereof, I hereunto subscribe my name.

HERMAN C. PRIEBE.